US012002959B2

United States Patent
Noi et al.

(10) Patent No.: US 12,002,959 B2
(45) Date of Patent: Jun. 4, 2024

(54) ANODE MATERIAL AND FLUORIDE ION BATTERY

(71) Applicant: TOYOTA JIDOSHA KABUSHIKI KAISHA, Toyota (JP)

(72) Inventors: Kousuke Noi, Uji (JP); Hidenori Miki, Hiratsuka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/585,317

(22) Filed: Jan. 26, 2022

(65) Prior Publication Data

US 2022/0263083 A1 Aug. 18, 2022

(30) Foreign Application Priority Data

Feb. 12, 2021 (JP) .................. 2021-020468

(51) Int. Cl.
*H01M 10/0562* (2010.01)
*H01M 4/36* (2006.01)
*H01M 4/38* (2006.01)
*H01M 4/62* (2006.01)
*H01M 10/05* (2010.01)
*H01M 4/46* (2006.01)

(52) U.S. Cl.
CPC ............ *H01M 4/62* (2013.01); *H01M 4/364* (2013.01); *H01M 4/381* (2013.01); *H01M 10/05* (2013.01); *H01M 10/0562* (2013.01); *H01M 4/466* (2013.01); *H01M 2300/008* (2013.01)

(58) Field of Classification Search
CPC ........... H01M 4/466; H01M 4/0407; H01M 10/0562; H01M 10/36; H01M 2300/008; H01M 4/62; H01M 4/364; H01M 4/381; H01M 10/05; H01M 2004/027; H01M 2300/0068
See application file for complete search history.

(56) References Cited

U.S. PATENT DOCUMENTS

| 4,352,869 A | 10/1982 | Mellors | |
|---|---|---|---|
| 2013/0309575 A1* | 11/2013 | Takahashi | H01M 4/583 429/223 |

(Continued)

FOREIGN PATENT DOCUMENTS

| CN | 110582874 A | 12/2019 |
|---|---|---|
| JP | S57-132677 A | 8/1982 |

(Continued)

OTHER PUBLICATIONS

Reddy et al. (J. Mater. Chem., 2011, 21, 17059) (Year: 2011).*

(Continued)

*Primary Examiner* — Milton I Cano
*Assistant Examiner* — Joshua P McClure
(74) *Attorney, Agent, or Firm* — Oliff PLC

(57) ABSTRACT

A main object of the present disclosure is to provide an anode material that is used in a fluoride ion battery and can prevent the decrease in operating voltage while inhibiting occurrence of short circuit. The present disclosure achieves the object by providing an anode material to be used in a fluoride ion battery, the anode material comprising a Mg material containing a Mg element, and a fluoride ion conductive material containing at least one kind of metal element excluding a Mg element, and a F element.

5 Claims, 3 Drawing Sheets

(56) References Cited

U.S. PATENT DOCUMENTS

| | | |
|---|---|---|
| 2018/0131038 A1 | 5/2018 | Miki |
| 2018/0159129 A1* | 6/2018 | Ide .................... H01M 10/0562 |
| 2018/0175382 A1 | 6/2018 | Chou et al. |
| 2019/0207244 A1 | 7/2019 | Komori |

FOREIGN PATENT DOCUMENTS

| | | |
|---|---|---|
| JP | 2018-077987 A | 5/2018 |
| JP | 2019-121596 A | 7/2019 |

OTHER PUBLICATIONS

Duvel et al. (J. Am. Chem. Soc. 2017, 139, 5842-5848) (Year: 2017).*
Breuer et al. (Dalton Trans., 2018, 47, 4105) (Year: 2018).*
Rongeat et al. (J. Mater. Chem. A, 2014, 2, 20861) (Year: 2014).*
Kubel et al., "Ba2.2Ca0.8Mg4F14, a New "Solid Solution Stabilized" Matrix for an Intense Blue Phosphor," Crystal Research and Technology, vol. 46, No. 9, 2011, pp. 899-905.
Mohammad et al., "Testing Mg as an Anode Against BiF3 and SnF2 Cathodes for Room Temperature Rechargeable Fluoride Ion Batteries," Materials Letters, vol. 244, 2019, pp. 159-162.

\* cited by examiner

ANODE MATERIAL AND FLUORIDE ION BATTERY

TECHNICAL FIELD

The present disclosure relates to an anode material.

BACKGROUND ART

As high-voltage and high-energy density batteries, for example, Li ion batteries are known. The Li ion batteries are cation-based batteries utilizing Li ions as carriers. Meanwhile, as anion-based batteries, fluoride ion batteries utilizing the fluoride ions as carriers have been known.

For example, Patent Literature 1 discloses a fluoride ion battery of which power generating element can be formed with two kinds of members that are specified electrode layer and solid electrolyte layer. Also, in the battery of Patent Literature 1, it is disclosed that a metal material including a metal element such as Pb, Sn, In, Bi and Sb is used in a solid electrolyte layer or an anode current collector.

CITATION LIST

Patent Literature

Patent Literature 1: Japanese Patent Application Laid-Open (JP-A) No. 2018-077987

SUMMARY OF DISCLOSURE

Technical Problem

In Patent Literature 1, an anode active material is self-formed from a solid electrolyte utilizing defluorination reaction of the solid electrolyte. Further, occurrence of short circuit is prevented by using the specified metal material in the solid electrolyte layer or the anode current collector. As in Patent Literature 1, although occurrence of short circuit may be prevented by using the specified metal element with respect to the anode active material that is self-formed, a new problem arises such that operating potential of battery decreases since the reaction potential of the anode active material shifts to noble potential side.

The present disclosure has been made in view of the above circumstances, and a main object of the present disclosure is to provide an anode material that is used in a fluoride ion battery and can prevent the decrease in operating voltage while inhibiting occurrence of short circuit.
Solution to Problem In order to achieve the object, the present disclosure provides an anode material to be used in a fluoride ion battery, the anode material comprising a Mg material containing a Mg element, and a fluoride ion conductive material containing at least one kind of metal element excluding a Mg element, and a F element.

According to the present disclosure, a fluoride ion conductive material is used together with a Mg material, and thus the anode material can prevent the decrease in operating voltage while inhibiting occurrence of short circuit.

In the disclosure, the Mg material may be a simple substance of Mg.

In the disclosure, the fluoride ion conductive material may function as an anode active material during charge and discharge.

In the disclosure, the fluoride ion conductive material may contain two kinds or more of the metal element.

In the disclosure, the fluoride ion conductive material may contain a Ca element, a Ba element, and a F element.

In the disclosure, the fluoride ion conductive material may be $Ca_{1-x}Ba_xF_2$, provided that x satisfies $0.45 \leq x \leq 0.65$.

In the disclosure, the fluoride ion conductive material may contain a La element, a Ba element, and a F element.

The present disclosure also provides a fluoride ion battery comprising a cathode layer, an anode layer, a solid electrolyte layer formed between the cathode layer and the anode layer; wherein the anode layer contains the above described anode material.

According to the present disclosure, the anode layer contains the above described anode material, and thus the fluoride ion battery can prevent the decrease in operating voltage while inhibiting occurrence of short circuit.

In the disclosure, a solid electrolyte in the solid electrolyte layer may contain the metal element and a F element.

In the disclosure, ion conductivity of a solid electrolyte in the solid electrolyte layer may be more than ion conductivity of the fluoride ion conducive material in the anode layer.
Advantageous Effects of Disclosure The present disclosure exhibits an effect of providing an anode material that is used in a fluoride ion battery and can prevent the decrease in operating voltage while inhibiting occurrence of short circuit.

DESCRIPTION OF EMBODIMENTS

Figure 1:
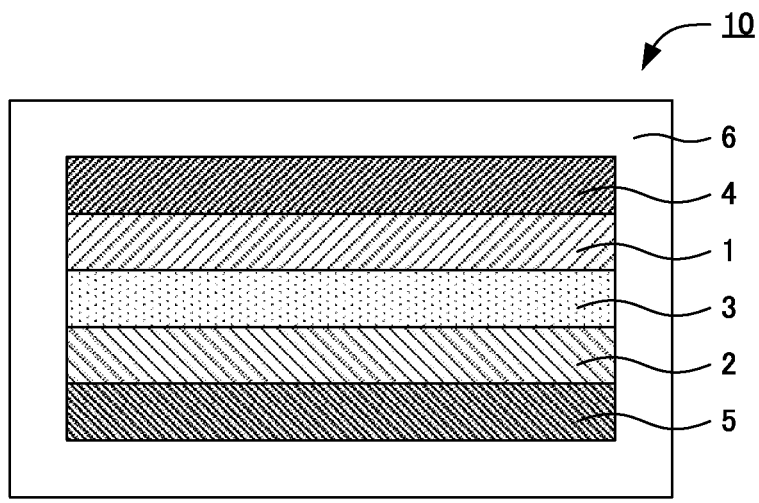
FIG. 1 is a schematic cross-sectional view illustrating an example of the fluoride ion battery in the present disclosure.

The anode material and the fluoride ion battery in the present disclosure will be hereinafter described in details.
A. Anode Material
The anode material in the present disclosure is an anode material to be used in a fluoride ion battery, the anode material comprising: a Mg material containing a Mg element; and a fluoride ion conductive material containing at least one kind of metal element excluding a Mg element, and a F element.

According to the present disclosure, a fluoride ion conductive material is used together with a Mg material, and thus the anode material can prevent the decrease in operating voltage while inhibiting occurrence of short circuit. As described above, in Patent Literature 1, an anode active material is self-formed from the solid electrolyte utilizing the defluorination reaction of the solid electrolyte. Further, occurrence of short circuit is prevented by using the specified metal material in the solid electrolyte layer or the anode current collector. As in Patent Literature 1, although occurrence of short circuit may be prevented by using the specified metal material with respect to the anode active material that is self-formed, a new problem arises such that operating potential of battery decreases since the reaction potential of the anode active material shifts to noble potential side.

In specific, the reaction potential (defluorination potential and fluorination potential) of the fluoride ion conductive material that functions as the anode active material source shifts in about 0.5 to 0.7 vs. $Pb^{2+}/Pb$ to the noble potential side (+potential side) due to the operation of the metal material (Pb, Sn, In, B or Sb) to be added. As a result, potential difference between the cathode active material and the anode active material decreases and the operating voltage of the battery decreases. In contrast, in the present disclosure, a Mg material is used as the metal material, and thus the shift amount is only about 0.3 vs. $Pb^{2+}/Pb$. As a result, by using the Mg material, the decrease in operating voltage can be prevented while inhibiting occurrence of short circuit.

Incidentally, although the mechanism of change in the reaction potential of the fluoride ion conductive material due to the addition of the metal material is not clear, presumed reason is such that the chemical bond between the metal material and the solid electrolyte is electrochemically rapidly generated at the time of starting discharge or during discharge to cause change in the electron structure (band structure) of the solid electrolyte, and the Fermi level of the material that is the parameter directing to the electrode potential changes.

Also, the mechanism of inhibiting occurrence of short circuit will be explained using the fluoride ion battery comprising layers in the order of a cathode layer, a solid electrolyte layer, and an anode layer. The defluorination and fluorination potentials of the fluoride ion conductive material in the anode layer slightly shifts to the noble (+) potential side under the presence of a Mg material. For this reason, at the time of discharge (when the potential of battery changes to base (−) side), defluorination of the fluoride ion conductive material in the anode layer occurs before the defluorination of the solid electrolyte in the solid electrolyte layer occurs. Thereby, the generation of discharge product (metal derived from solid electrolyte) in the solid electrolyte layer can be prevented. As a result, occurrence of short circuit can be inhibited.

The anode material in the present disclosure includes a Mg material containing a Mg element. The Mg material may be a simple substance of Mg and may be a Mg alloy. The Mg alloy is preferably an alloy mainly composed of Mg. The proportion of the Mg element in the Mg alloy is, for example, 50 at % or more, may be 70 at % or more, and may be 90 at % or more. The proportion of the Mg element in the Mg alloy may be measured by, for example, an ICP emission spectrometry. The anode material may contain just one kind of the Mg material, and may contain two kinds or more thereof. Also, the anode material preferably contains at least a simple substance of Mg.

Examples of the shape of the Mg material may include a granular shape. The average particle size ($D_{50}$) of the Mg material is, for example, 0.1 μm or more and 50 μm or less. The average particle size ($D_{50}$) can be obtained from the result of particle distribution measurement by a laser diffraction scattering method.

The proportion of the Mg material in the anode material is, for example, 20 weight % or more, may be 30 weight % or more, and may be 40 weight % or more. Meanwhile, the proportion of the Mg material is, for example, 50 weight % or less.

Also, the anode material in the present disclosure includes a fluoride ion conductive material containing at least one kind of metal element excluding a Mg element, and a F element. The fluoride ion conductive material has fluoride ion conductivity. Also, the fluoride ion conductive material functions as an anode active material during charge and discharge. For example, when the fluoride ion conductive material is $La_{0.9}Ba_{0.1}F_{2.9}$, a reaction that occurs during charge (when F- desorb) is as below:

$$La_{0.9}Ba_{0.1}F_{2.9} + 2.7e^- \rightarrow 0.9La + 0.1BaF_2 + 2.7F^-.$$

That is, an anode active material is generated from the fluoride ion conductive material in self-forming manner. The anode material in the present disclosure preferably includes the fluoride ion conductive material as a main anode active material. "As a main anode active material" means that the capacity derived from the fluoride ion conductive material (and its charge product) is the most among all the capacities. Also, the anode material in the present disclosure may not include anode active materials other than the fluoride ion conductive material.

The fluoride ion conductive material usually contains a metal element M other than Mg, and a F element, and has fluoride ion conductivity. Examples of the metal element M may include a lanthanoid element such as La and Ce, an alkali earth element (excluding Mg) such as Ca, Sr, and Ba, an element of 14th group such as Pb and Sn, and an alkali element such as Li, Na, K, Rb, and Cs. Among them, it is preferable that the metal element M is at least one kind of a La element, a Ba element, a Pb element, a Sn element, a Ca element, and a Ce element. The reason therefor is to obtain a fluoride ion conductive material with excellent ion conductivity. The fluoride ion conductive material may contain just one kind of the metal element M, and may contain two kinds or more thereof. Also, the fluoride ion conductive material may contain at least a Ba element as the metal element M.

The fluoride ion conductive material preferably contains Ca and Ba as the metal element M. In other words, the fluoride ion conductive material preferably contains a Ca element, a Ba element, and a F element. The reason therefor is to obtain a fluoride ion conductive material with excellent ion conductivity. In this case, the fluoride ion conductive material is preferably $Ca_{1-x}Ba_xF_2$, provided that x satisfies 0<x<1. The "x" may be 0.45 or more, may be 0.50 or more, and may be 0.55 or more. Meanwhile, the "x" may be 0.65 or less, and may be 0.60 or less. In particular, when the "x" satisfies $0.45 \leq x \leq 0.65$, reversible capacity improves.

Also, the fluoride ion conductive material preferably contains La and Ba as the metal element M. In other words, the fluoride ion conductive material preferably contains a La element, a Ba element, and a F element. The reason therefor is to obtain a fluoride ion conductive material with excellent ion conductivity. In this case, the fluoride ion conductive material is preferably $La_{1-x}Ba_xF_{3-x}$, provided that x satisfies 0<x<1. The "x" may be 0.05 or more, and may be 0.1 or more. Meanwhile, the "x" may be 0.8 or less, and may be 0.6 or less.

Examples of the shape of the fluoride ion conductive material may include a granular shape. Also, the average particle size ($D_{50}$) of the fluoride ion conductive material is, for example, 0.1 μm or more and 50 μm or less.

The proportion of the fluoride ion conductive material in the anode material is, for example, 50 weight % or more, may be 60 weight % or more, and may be 70 weight % or more. Meanwhile, the proportion of the fluoride ion conductive material is, for example, 90 weight % or less, and may be 80 weight % or less.

Also, the anode material in the present disclosure may further contain at least one of a conductive material (electron conductive material) and a binder, as required. Examples of the conductive material may include a carbon material. Examples of the carbon material may include carbon black such as acetylene black, Ketjen black, furnace black and thermal black, graphene, fullerene, and carbon nanotube. Meanwhile, examples of the binder may include a fluorine-based binder such as polyvinylidene fluoride (PVDF) and polytetra fluoroethylene (PTFE).

Also, the anode material in the present disclosure may be a composite material in which the Mg material and the fluoride ion conductive material are conjugated. The composite material may be obtained by, for example, conducting mechanical milling to a mixture containing the Mg material and the fluoride ion conductive material.

The anode material in the present disclosure is usually used in a fluoride ion battery. The fluoride ion battery will be described later.

B. Fluoride Ion Battery

FIG. 1 is a schematic cross-sectional view illustrating an example of the fluoride ion battery in the present disclosure. Fluoride ion battery 10 illustrated in FIG. 1 comprises cathode layer 1, anode layer 2, solid electrolyte layer 3 formed between the cathode layer 1 and the anode layer 2, cathode current collector 4 for collecting currents of the cathode layer 1, anode current collector 5 for collecting currents of the anode layer 2, and battery case 6 for storing these members. In the present disclosure, the anode layer 2 contains the above described anode material. Incidentally, the fluoride ion battery in the present disclosure includes a solid electrolyte layer, and thus, may be referred to as an all solid fluoride ion battery.

According to the present disclosure, the anode layer contains the above described anode material, and thus the fluoride ion battery can prevent the decrease in operating voltage while inhibiting the occurrence of short circuit.

1. Anode Layer

The anode layer in the present disclosure is a layer containing at least the above described anode material. The anode material is in the same contents as those described in "A. Anode material" above; thus, the descriptions herein are omitted. There are no particular limitations on the thickness of the anode layer, and it may be appropriately adjusted depending on constitutions of the battery.

2. Cathode Layer

The cathode layer in the present disclosure is a layer containing at least a cathode active material. Also, the cathode layer may further contain at least one of a solid electrolyte, a conductive material, and a binder, as required.

The cathode active material is usually an active material of which defluorination occurs during discharge. Examples of the cathode active material may include a simple substance of metal, an alloy, a metal oxide, and fluorides of these. Examples of the metal element included in the cathode active material may include Cu, Ag, Ni, Co, Pb, Ce, Mn, Au, Pt, Rh, V, Os, Ru, Fe, Cr, Bi, Nb, Sb, Ti, Sn, and Zn. Among them, the cathode active material is preferably Cu, $CuF_z$, Fe, $FeF_z$, Ag, and $AgF_z$. Incidentally, the "z" is a real number larger than 0. Also, additional examples of the cathode active material may include a carbon material and a fluoride thereof. Examples of the carbon material may include graphite, cork, and carbon nanotube. Also, further additional examples of the cathode active material may include a polymer material. Examples of the polymer material may include polyaniline, polypyrrole, polyacetylene, and polythiophene.

The content of the cathode active material in the cathode layer is not particularly limited, but is preferably large from the viewpoint of capacity. The content of the cathode active material is, for example, 30 weight % or more, may be 50 weight % or more, and may be 70 weight % or more. The conductive material and the binder are in the same contents as those described in "A. Anode material"; thus, the descriptions herein are omitted. Also, the solid electrolyte is in the same contents as those described in "3. Solid electrolyte layer". Also, there are no particular limitations on the thickness of the cathode layer, and it may be appropriately adjusted depending on constitutions of the battery.

3. Solid Electrolyte Layer

The solid electrolyte layer in the present disclosure is a layer formed between the cathode layer and the anode layer, and contains at least a solid electrolyte. Also, the solid electrolyte layer may further contain a binder as required.

The solid electrolyte is not particularly limited if it is a material with fluoride ion conductivity, but usually is an inorganic fluoride. Examples of the inorganic fluoride may include a fluoride containing a lanthanoid element such as La and Ce, a fluoride containing an alkali earth element such as Ca, Sr and Ba, a fluoride containing an element of 14th group such as Pb and Sn, and a fluoride containing an alkali element such as Li, Na, K, Rb, and Cs.

In the present disclosure, the solid electrolyte in the solid electrolyte layer preferably contains the above mentioned metal element (the same metal element as the metal element in the above described fluoride ion conductive material), and a F element. The reason therefor is to effectively inhibit occurrence of short circuit.

In particular, it is preferable that the kind of the constituent element of the solid electrolyte in the solid electrolyte layer is the same as the kind of the constituent element of the fluoride ion conductive material in the anode layer. For example, when the solid electrolyte in the solid electrolyte layer is $Ca_{1-x}Ba_xF_2$ provided that $0<x<1$ and the fluoride ion conductive material in the anode layer is $Ca_{1-y}Ba_yF_2$ provided that $0<y<1$, it can be said that the kind of the constituent elements is the same. The "x" and the "y" may be the same and may be different. In other words, the composition of the solid electrolyte in the solid electrolyte layer and the composition of the fluoride ion conductive material in the anode layer may be the same and may be different.

Also, in the present disclosure, ion conductivity of the solid electrolyte in the solid electrolyte layer may be more than ion conductivity of the fluoride ion conducive material in the anode layer. The reason therefor is to inhibit overvoltage and to obtain large specific capacity. The ion conductivity of the solid electrolyte in the solid electrolyte layer is regarded as $C_1$ and the ion conductivity of the fluoride ion conducive material in the anode layer is regarded as $C_2$. $C_1$ may be the same as $C_2$, and may be larger than $C_2$. The value of $C_1/C_2$ is, for example, 1.00 or more, may be 1.05 or more, and may be 1.10 or more.

The binder is in the same contents as those described in "A. Anode material"; thus, the descriptions herein are omitted. The thickness of the solid electrolyte layer is not particularly limited, and may be appropriately adjusted depending on constitutions of the battery.

4. Other Constitutions

The fluoride ion battery in the present disclosure preferably comprises a cathode current collector for collecting currents of the cathode layer, an anode current collector for collecting currents of the anode layer, and a battery case for storing the above described members. Examples of the shape of the current collectors may include a foil shape, a mesh shape, and a porous shape. Also, as the battery case, conventionally known battery cases may be used.

5. Fluoride Ion Battery

The fluoride ion battery in the present disclosure may be a primary battery and may be a secondary battery, but preferably a secondary battery among them. The reason therefor is to be repeatedly charged and discharged and useful as a car-mounted battery for example. Incidentally, the secondary battery includes the usage as the primary battery (usage for the purpose of just one time discharge after charge). Also, examples of the shape of the fluoride ion battery may include a coin shape, a laminate shape, a cylindrical shape and a square shape.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Example 1

<Synthesis of Fluoride Ion Conductive Material>

As raw materials, $CaF_2$ and $BaF_2$ were prepared and weighed so as to $CaF_2:BaF_2=80:20$ in the molar ratio. These were mixed and reacted by mechanical milling using a planetary ball milling (PL-7 from Fritsch) and thereby powder fluoride ion conductive material ($Ca_{0.8}Ba_{0.2}F_2$) was obtained. Incidentally, the conditions of the mechanical milling were 600 rpm, 20 hours, and dry argon atmosphere.

<Production of Anode Material>

Powder Mg (simple substance of Mg), the fluoride ion conductive material ($Ca_{0.8}Ba_{0.2}F_2$), and a conductive material (acetylene black carbon) were weighed so as to be powder Mg: fluoride ion conductive material: conductive material=35:62:3 in the weight ratio. These were mixed by mechanical milling using a planetary ball milling (PL-7 from Fritsch) and thereby powder anode material was prepared. The conditions of the mechanical milling were 600 rpm, 3 hours and dry argon atmosphere.

<Synthesis of Solid Electrolyte>

As raw materials, $CaF_2$ and $BaF_2$ were prepared and weighed so as to $CaF_2:BaF_2=60:40$ in the molar ratio. These were mixed and reacted by mechanical milling using a planetary ball milling (PL-7 from Fritsch) and thereby powder solid electrolyte ($Ca_{0.6}Ba_{0.4}F_2$) was obtained. Incidentally, the conditions of the mechanical milling were 600 rpm, 20 hours, and dry argon atmosphere. Incidentally, the ion conductivity of $Ca_{0.6}Ba_{0.4}F_2$ was higher than that of the above described fluoride ion conductive material ($Ca_{0.8}Ba_{0.2}F_2$) and the fluoride ion conductive materials ($Ca_{0.5}Ba_{0.5}F_2$, $Ca_{0.4}Ba_{0.6}F_2$, and $Ca_{0.3}Ba_{0.7}F_2$) in later described Examples 3 to 5.

<Production of Evaluation Battery (Half Cell)>

Layered were in the order of an Al foil (counter electrode current collector), a powder compression body (counter electrode) formed by 50 mg of $PbF_2$ powder (including 5 weight % of acetylene black carbon) on a Pb foil, a powder compression body (solid electrolyte layer) of 100 mg of solid electrolyte ($Ca_{0.6}Ba_{0.4}F_2$), and a powder compression body (working electrode) of 10 mg of anode material, and a Pt foil (working electrode current collector). Incidentally, the Pb foil in the counter electrode was placed in the side contacting the Al foil. This layered body was placed inside a cylindrical container having an inner diameter of 11.28 mm, and sandwiched by round column made of stainless steel having a diameter of 11.28 mm from the both side of the counter electrode current collector and the working electrode current collector. In this manner, an evaluation battery (half cell) was produced.

Example 2

An evaluation battery was produced in the same manner as in Example 1, except that the ratio of $CaF_2$ and $BaF_2$ was changed to $CaF_2:BaF_2=60:40$ in the molar ratio to synthesis a fluoride ion conductive material ($Ca_{0.6}Ba_{0.4}F_2$).

Example 3

An evaluation battery was produced in the same manner as in Example 1, except that the ratio of $CaF_2$ and $BaF_2$ was changed to $CaF_2:BaF_2=50:50$ in the molar ratio to synthesis a fluoride ion conductive material ($Ca_{0.5}Ba_{0.5}F_2$).

Example 4

An evaluation battery was produced in the same manner as in Example 1, except that the ratio of $CaF_2$ and $BaF_2$ was changed to $CaF_2:BaF_2=40:60$ in the molar ratio to synthesis a fluoride ion conductive material ($Ca_{0.4}Ba_{0.6}F_2$).

Example 5

An evaluation battery was produced in the same manner as in Example 1, except that the ratio of $CaF_2$ and $BaF_2$ was changed to $CaF_2:BaF_2=30:70$ in the molar ratio to synthesis a fluoride ion conductive material ($Ca_{0.3}Ba_{0.7}F_2$).

Comparative Example 1

Powder In (simple substance of In), a fluoride ion conductive material ($Ca_{0.8}Ba_{0.2}F_2$), and a conductive material (acetylene black carbon) were weighed so as to be powder In:fluoride ion conductive material:conductive material=30:65:5 in the weight ratio. An anode material and an evaluation battery were produced in the same manner as in Example 1 except that the obtained mixture was used.

[Evaluation]

<XRD Measurement>

An X-ray diffraction measurement was conducted to the anode materials obtained in Examples 1 to 5. In specific, the measurement was conducted using SmartLab from Rigaku Corporation with a concentration method irradiating a CuKα ray. The results are shown in FIG. 2.

Figure 2:
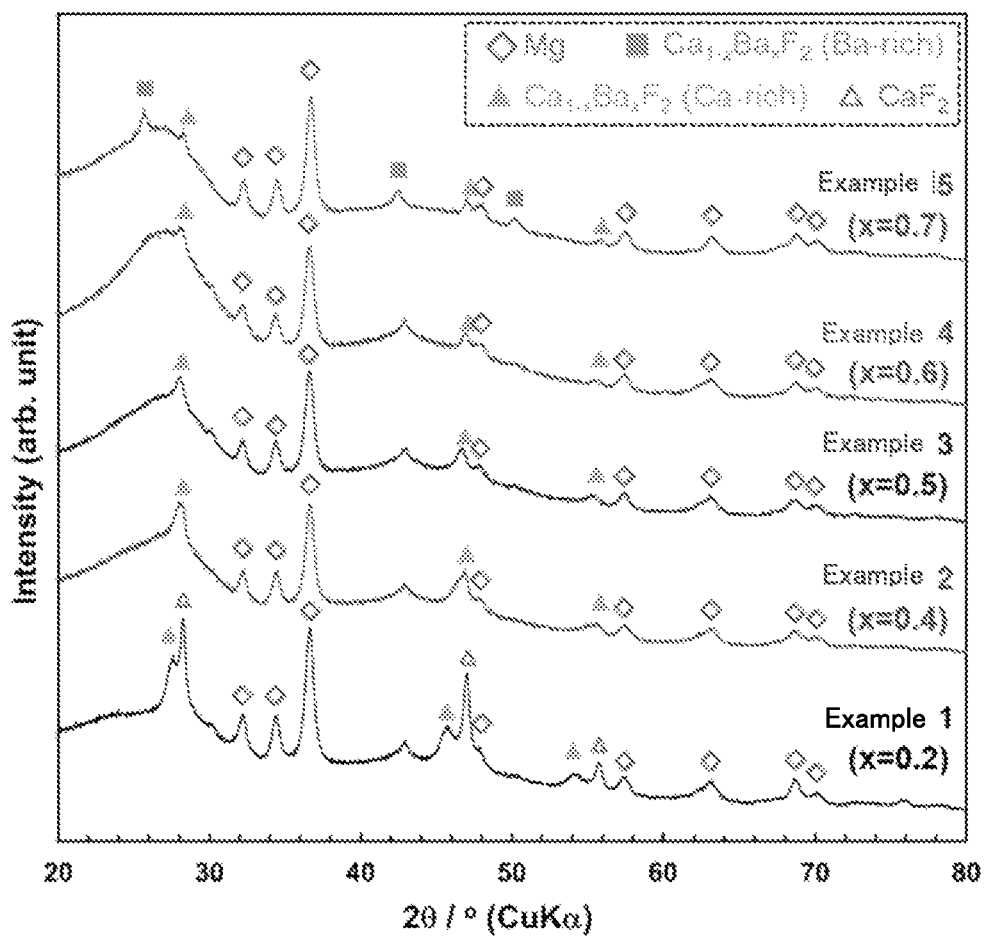
FIG. 2 is the results of XRD measurements for anode materials obtained in Examples 1 to 5.
Figure 3A:
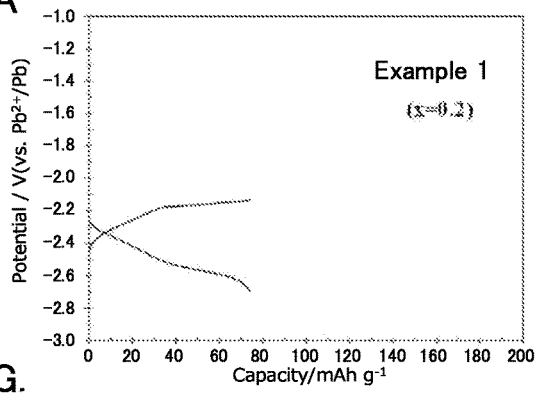
FIGS. 3A to 3F are charge and discharge curves of Examples 1 to 5 and Comparative Example 1.
Figure 3B:
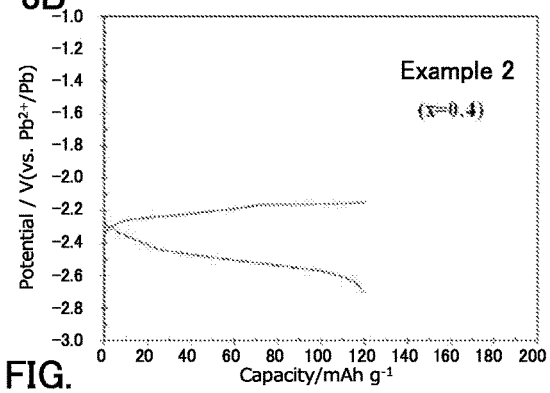
Figure 3C:
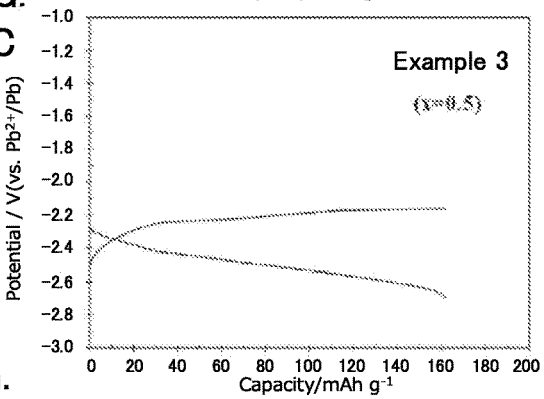
Figure 3D:
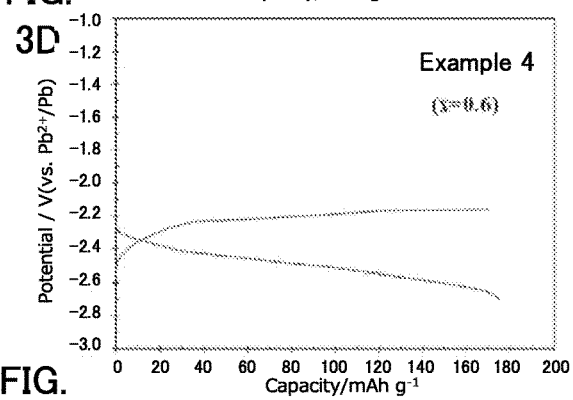
Figure 3E:
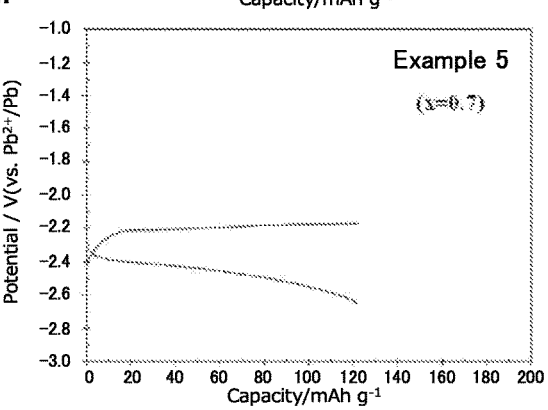
Figure 3F:
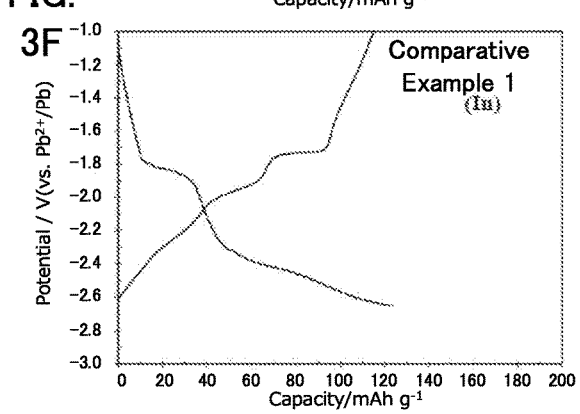

As shown in FIG. 2, in all Examples 1 to 5, the peak derived from Mg, the peak derived from the fluoride ion conductive material rich in Ca, and the peak derived from the fluoride ion conductive material rich in Ba were confirmed. Also, in Example 1, the peak of $CaF_2$ was also confirmed as unreacted raw material (residue component).

<Composition Analysis>

Composition analysis was conducted to the anode materials obtained in Examples 1 to 5. In specific, a mapping measurement setting the observation field magnification to 1000 times was conducted to the surface of pellet formed by powder-molding the obtained anode material, using SEM-EDS (SU-8820 from Hitachi High-Tech Corporation; EMAX Evolution from Oxford Instruments), and thereby the composition was respectively analyzed. The results are shown in Table 1.

TABLE 1

|  | Weight % Concentration | | | | | Ba/(Ca + Ba) [Atom number ratio] | |
| --- | --- | --- | --- | --- | --- | --- | --- |
|  | C | F | Mg | Ca | Ba | Prepared | Measured |
| Example 1 | 5.04 | 21.19 | 30.22 | 22.25 | 21.3 | 0.20 | 0.22 |
| Example 2 | 4.93 | 17.05 | 29.47 | 13.59 | 34.96 | 0.40 | 0.43 |
| Example 3 | 5.02 | 15.38 | 29.51 | 10.35 | 39.75 | 0.50 | 0.53 |
| Example 4 | 5.64 | 13.49 | 28.57 | 7.63 | 44.67 | 0.60 | 0.63 |
| Example 5 | 6.5 | 14.81 | 34.32 | 4.43 | 39.94 | 0.70 | 0.73 |

As shown in Table 1, the atom number ratio of Ba and Ca matched in the prepared (raw material) and measured value, and it was confirmed that the desired anode materials were synthesized.

<Discharge and Charge Test>

Discharge and charge test was conducted to the evaluation batteries (half cells) produced in Examples 1 to 5 and Comparative Example 1, and the reversible capacity and the average operating potential were obtained. In specific, the half cell was put in a sealed container, and the test was conducted at 200° C. while vacuuming inside the container. First, the cell was discharged (operated to base potential direction) at the current density of 50 μA/cm². Next, the cell was charged (operated to noble potential direction) at the same current density. The cut-off potential was −2.65 V vs. $Pb^{2+}$/Pb in discharge and −1.00 V vs. $Pb^{2+}$/Pb in charge. However, the capacity limitation was arranged as the condition of terminating the charge, so as the charge capacity did not exceed the discharge capacity until the test ended.

Figure 4:
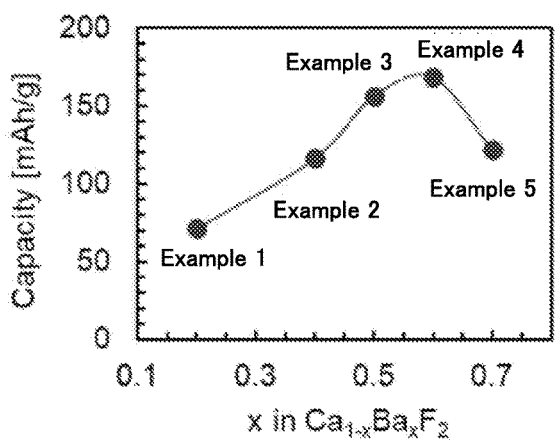
FIG. 4 is a graph comparing capacities of Examples 1 to 5.

Charge and discharge curves of Examples 1 to 5 and Comparative Example 1 are shown in FIGS. 3A to 3F. Incidentally, the horizontal axis (specific capacity) in each drawing is standardized with the weight of $Ca_{1-x}Ba_xF_2$ (fluoride ion conductive material) in the anode material. Also, the results of reversible capacity in Examples 1 to 5 are shown in FIG. 4. Further, the results of the reversible capacity and the average operating potential are shown in Table 2. Incidentally, the average operating potential was calculated by reading the potentials at the time of discharge and charge when capacity was respectively 50% taken out, and taking the average thereof.

tial baser than −2.65 V vs. $Pb^{2+}$/Pb in the anode material (PRISTINE $Ca_{1-x}Ba_xF_2$) to which the metal material was not added. Also, in the evaluation battery (half cell) using PRISTINE $Ca_{1-x}Ba_xF_2$ as the anode material, short circuit occurred along with the defluorination proceeded.

Meanwhile, in Examples 1 to 5 and Comparative Example 1, it was presumed that the occurrence of short circuit was inhibited since the defluorination potential of $Ca_{1-x}Ba_xF_2$ shifted to the noble direction when the metal material (Mg and In) was added, and the defluorination from the solid electrolyte layer (PRISTINE $Ca_{0.6}Ba_{0.4}F_2$) did not occur.

Also, as shown in Table 2, the average operating potential of the anode materials in Examples 1 to 5 was generally −2.3 V vs. $Pb^{2+}$/Pb, and the average operating potential of the anode material in Comparative Example 1 was −2.16 V vs. $Pb^{2+}$/Pb. In other words, it was confirmed that the anode materials in Examples 1 to 5 operated at baser potential than that of the anode material in Comparative Example 1. Here, assumed is a case using Cu of which operating potential is approximately +0.7 V vs. $Pb^{2+}$/Pb as the representative cathode active material of a fluoride ion battery. When a fluoride ion battery (full cell) using Cu as the cathode active material is assumed, the operating voltage (cathode operating potential—anode operating potential) would be 3.05 V in Example 1, 3.04 V in Example 2, 3.06 V in Example 3, 3.05 V in Example 4, and 3.02 V in Example 5. In contrast, the operating voltage of Comparative Example 1 would be 2.86 V. In this manner, it was confirmed that the occurrence of short circuit was inhibited when a Mg material was used as well as when an In material was used, and further, the decrease in operating voltage was prevented more when the Mg material was used compared to when the In material was used.

Also, as shown in FIG. 4 and Table 2, it was confirmed that the exceedingly large reversible capacity was shown in Example 3 (x=0.5) and Example 4 (x=0.6). In other words, when the value of x in $Ca_{1-x}Ba_xF_2$ was controlled, the anode with excellent reversible capacity was obtained. This is presumably because the overvoltage was inhibited in the compositions of Examples 3 and 4 since regions with gentle slope appeared in discharge curves in the discharge initial

TABLE 2

|  | Anode material | | x in $Ca_{1-x}Ba_xF_2$ | Reversible capacity [mAh/g] | Average operating potential [V vs. $Pb^{2+}$/Pb] |
| --- | --- | --- | --- | --- | --- |
|  | Metal | $F^-$ conductive material | | | |
| Example 1 | Simple substance of Mg | $Ca_{0.8}Ba_{0.2}F_2$ | 0.2 | 71.2 | −2.35 |
| Example 2 | Simple substance of Mg | $Ca_{0.6}Ba_{0.4}F_2$ | 0.4 | 116.2 | −2.34 |
| Example 3 | Simple substance of Mg | $Ca_{0.5}Ba_{0.5}F_2$ | 0.5 | 156.4 | −2.36 |
| Example 4 | Simple substance of Mg | $Ca_{0.4}Ba_{0.6}F_2$ | 0.6 | 168.7 | −2.35 |
| Example 5 | Simple substance of Mg | $Ca_{0.3}Ba_{0.7}F_2$ | 0.7 | 121.7 | −2.32 |
| Comparative Example 1 | Simple substance of In | $Ca_{0.3}Ba_{0.2}F_2$ | 0.7 | 114.9 | −2.16 |

As shown in FIGS. 3A to 3F, in all Examples 1 to 5 and Comparative Example 1, discharge and charge were possible without the occurrence of short circuit. Incidentally, from the result of a cyclic voltammetry test (research on reaction potential of materials) conducted by inventors separately, it was confirmed that the defluorination occurred at the potenstage, middle stage, and end stage compared to other Examples in the charge and discharge curves shown in FIGS. 3A to 3F. The reason therefor is not clear, but it is presumably because the ion transferring properties inside the anode depends on the value of x, and the properties were maximized in the compositions of above Examples.

Example 6

<Synthesis of Fluoride Ion Conductive Material>

As raw materials, $LaF_3$ and $BaF_2$ were prepared, and weighed so as to be $LaF_3:BaF_2=90:10$ in the molar ratio. These were mixed by mechanical milling using a ball milling device, and then burned in an argon atmosphere to cause reaction. Thereby, powder fluoride ion conductive material ($La_{0.9}Ba_{0.1}F_{2.9}$) was obtained. Incidentally, the conditions of mechanical milling were 600 rpm, 20 hours, and dry argon atmosphere, and conditions of burning were 800° C. and 3 hours.

<Production of Anode Material>

Powder Mg (simple substance of Mg), the fluoride ion conductive material ($La_{0.9}Ba_{0.1}F_{2.9}$) and a conductive material (acetylene black carbon) were weighed so as to be powder Mg:fluoride ion conductive material:conductive material=27:70:3 in the weight ratio. An anode material was produced in the same manner as in Example 1 except that the obtained mixture was used.

<Production of Evaluation Battery (Half Cell)>

An evaluation battery was produced in the same manner as in Example 1, except that powder compression body of $La_{0.9}Ba_{0.1}F_{2.9}$ 150 mg was used as the solid electrolyte layer and powder compression body of the anode material 15 mg was used as the working electrode.

Comparative Example 2

Powder In (simple substance of In), a fluoride ion conductive material ($La_{0.9}Ba_{0.1}F_{2.9}$), and a conductive material (acetylene black carbon) were weighed so as to be powder In:fluoride ion conductive material:conductive material=20:80:0 in the weight ratio. An anode material and an evaluation battery were produced in the same manner as in Example 6 except that the obtained mixture was used.

<Discharge and Charge Test>

Discharge and charge test was conducted to the evaluation batteries (half cells) produced in Example 6 and Comparative Example 2, and the reversible capacity and the average operating potential were obtained. In specific, the half cell was put in a sealed container, and the test was conducted at 140° C. while vacuuming inside the container. First, the cell was discharged (operated to base potential direction) at the current density of 10 μA/cm². Next, the cell was charged (operated to noble potential direction) at the same current density. The cut-off potential was −2.40 V vs. $Pb^{2+}/Pb$ in discharge, and −1.00 V vs. $Pb^{2+}/Pb$ in charge. However, the capacity limitation was arranged as the condition of terminating the charge, so as the charge capacity did not exceed the discharge capacity until the test ended.

Figure 5A:
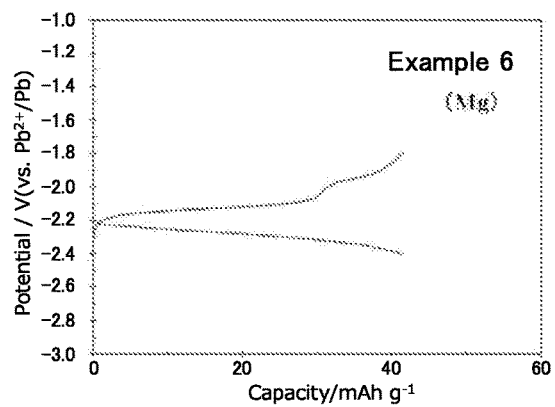
FIGS. 5A and 5B are charge and discharge curves of Example 6 and Comparative Example 2.
Figure 5B:
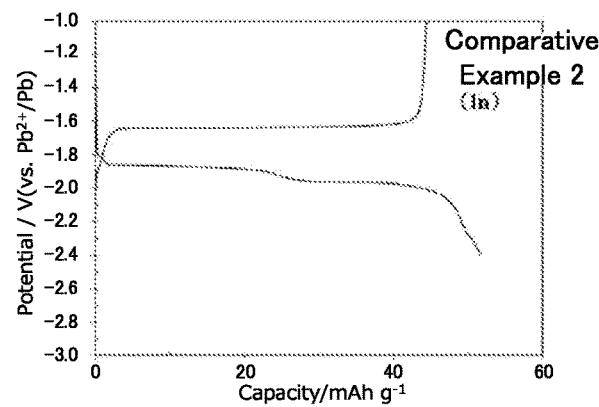

Charge and discharge curves of Example 6 and Comparative Example 2 are shown in FIGS. 5A and 5B. Incidentally, the horizontal axis (specific capacity) in each drawing of FIGS. 5A and 5B is standardized with the weight of $La_{0.9}Ba_{0.1}F_{2.9}$ (fluoride ion conductive material) in the anode material. Also, the results of reversible capacity and average operating potential of Example 6 and Comparative Examples 2 are shown in Table 3.

TABLE 3

|  | Anode material | | Reversible capacity [mAh/g] | Average operating potential [V vs. $Pb^{2+}/Pb$] |
|---|---|---|---|---|
|  | Metal | $F^-$ conductive material | | |
| Example 6 | Simple substance of Mg | $La_{0.9}Ba_{0.1}F_{2.9}$ | 41.4 | −2.20 |
| Comparative Example 2 | Simple substance of In | $La_{0.9}Ba_{0.1}F_{2.9}$ | 48.3 | −1.79 |

As shown in FIGS. 5A and 5B, in both Example 6 and Comparative Example 2, discharge and charge were possible without occurrence of short circuit. Incidentally, from the result of cyclic voltammetry test (research on reaction potential of materials) conducted by inventors separately, it was confirmed that the defluorination of the anode material (PRISTINE $La_{0.9}Ba_{0.1}F_{2.9}$) to which a metal material was not added occurred at baser potential than −2.40 V vs. $Pb^{2+}/Pb$. Also, in the evaluation battery (half cell) using PRISTINE $La_{0.9}Ba_{0.1}F_{2.9}$ as the anode material, short circuit occurred along with the defluorination proceeded.

Meanwhile, in Example 6 and Comparative Example 2, it was presumed that the occurrence of short circuit was inhibited since the defluorination potential of $La_{0.9}Ba_{0.1}F_{2.9}$ shifted to noble direction when the metal material (Mg and In) was added, and the defluorination from the solid electrolyte layer (PRISTINE $La_{0.9}Ba_{0.1}F_{2.9}$) did not occur.

Also, as shown in Table 3, the average operating potential of the anode material in Example 6 was −2.20 V vs. $Pb^{2+}/Pb$, and the average operating potential of the anode material in Comparative Example 2 was −1.79 V vs. $Pb^{2+}/Pb$. In other words, it was confirmed that the anode material in Example 6 operated at baser potential compared to the anode material in Comparative Example 2. Here, assumed is a case using Cu of which operating potential is approximately +0.7 V vs. $Pb^{2+}/Pb$ as the representative cathode active material of a fluoride ion battery. When a fluoride ion battery (full cell) using Cu as the cathode active material is assumed, operating voltage (cathode operating potential—anode operating potential) would be 2.90 V in Example 6. In contrast, the operating voltage of Comparative Example 2 would be 2.49 V. In this manner, it was confirmed that the occurrence of short circuit was inhibited when a Mg material was used as well as when an In material was used, and further, the decrease in operating voltage was prevented more when the Mg material was used compared to when the In material was used.

REFERENCE SINGS LIST 1 cathode layer 2 solid electrolyte layer 3 anode layer 4 cathode current collector 5 anode current collector 6 battery case 10 fluoride ion battery

What is claimed is:

1. A fluoride ion battery comprising a cathode layer, an anode layer, and a solid electrolyte layer formed between the cathode layer and the anode layer; wherein
  the anode layer contains an anode material comprising:
    a Mg metal powder; and
    a fluoride ion conductive material comprised of $Ca_{1-x}Ba_xF_2$ in which x satisfies $0.5 \leq x \leq 0.6$.

2. The fluoride ion battery according to claim 1, wherein the fluoride ion conductive material functions as an anode active material during charge and discharge.

3. The fluoride ion battery according to claim 1, wherein a solid electrolyte in the solid electrolyte layer is $Ca_{1-x}Ba_xF_2$ in which $0<x<1$.

4. The fluoride ion battery according to claim 1, wherein an ion conductivity of a solid electrolyte in the solid electrolyte layer is more than an ion conductivity of the fluoride ion conductive material in the anode layer.

5. The fluoride ion battery according to claim 1, wherein an average particle size of the Mg metal powder is 0.1 μm or more and 50 μm or less.

* * * * *